United States Patent [19]
Beaupre et al.

[11] Patent Number: 5,892,771
[45] Date of Patent: Apr. 6, 1999

[54] SYSTEM FOR ESTABLISHING A TDM INFORMATION PROTOCOL OVER A COMMUNICATIONS PATH

[75] Inventors: Kenneth Beaupre, Amherst, N.H.; David B. Tweed, Chelmsford, Mass.

[73] Assignee: Intraplex Incorporated, Westford, Mass.

[21] Appl. No.: 764,617

[22] Filed: Dec. 11, 1996

[51] Int. Cl.$^6$ .................................................... H04J 3/22
[52] U.S. Cl. ........................ 370/476; 370/532; 370/538
[58] Field of Search ................................ 370/472, 476, 370/522, 523, 524, 528, 532, 537, 538, 540, 541

[56] References Cited

U.S. PATENT DOCUMENTS 4,730,312  3/1988  Johnson et al. ..................... 370/523
4,928,276  5/1990  Blondeau, Jr. et al. .
5,005,171  4/1991  Modisette, Jr. et al. .
5,528,579  6/1996  Wadman et al. .

*Primary Examiner*—Min Jung
*Attorney, Agent, or Firm*—Lappin & Kusmer LLP

[57] ABSTRACT

System for establishing a TDM information protocol over a communications path includes a transmit section and a receive section. In general, the transmit element receives a succession of data elements from each of a plurality of independent channels and combines the data elements to form a single TDM sequence of data elements. The receive element receives a TDM sequence of data elements and separates the sequence into its constituent components to form a plurality of channels, each forming a succession of data elements. In one form of the invention, data elements transmitted via the TDM communications path are limited to a single time slot in the TDM protocol.

7 Claims, 5 Drawing Sheets

| Subframe # | Bit 1 | Bit 2 | Bit 3 | Bit 4 | Bit 5 | Bit 6 | Bit 7 | Bit 8 |
|---|---|---|---|---|---|---|---|---|
| 1, 6, 11 | F | D1 | D2 | D3 | D4 | D5 | D1 | $M_{1,p}$ |
| 2, 7, 12 | F | D2 | D3 | D4 | D5 | D1 | D2 | $M_{2,p}$ |
| 3, 8, 13 | F | D3 | D4 | D5 | D1 | D2 | D3 | $M_{3,p}$ |
| 4, 9, 14 | F | D4 | D5 | D1 | D2 | D3 | D4 | $M_{4,p}$ |
| 5, 10, 15 | F | D5 | D1 | D2 | D3 | D4 | D5 | $M_{5,p}$ |

F = Subframe bit
$M_{n,p}$ = Control bit
Dn = Data bit

Subframe Pattern = 00110 11111 11111

| Subframe # | Bit 1 | Bit 2 | Bit 3 | Bit 4 | Bit 5 | Bit 6 | Bit 7 | Bit 8 |
|---|---|---|---|---|---|---|---|---|
| 1, 6, 11 | F | D1 | D2 | D3 | D4 | D5 | D1 | $M_{1,p}$ |
| 2, 7, 12 | F | D2 | D3 | D4 | D5 | D1 | D2 | $M_{2,p}$ |
| 3, 8, 13 | F | D3 | D4 | D5 | D1 | D2 | D3 | $M_{3,p}$ |
| 4, 9, 14 | F | D4 | D5 | D1 | D2 | D3 | D4 | $M_{4,p}$ |
| 5, 10, 15 | F | D5 | D1 | D2 | D3 | D4 | D5 | $M_{5,p}$ |

Subframe Pattern = 00110 11111 11111

F = Subframe bit
$M_{n,p}$ = Control bit

Dn = Data bit

FIGURE 4

SYSTEM FOR ESTABLISHING A TDM INFORMATION PROTOCOL OVER A COMMUNICATIONS PATH

FIELD OF THE INVENTION

The present invention relates to methods and devices for transmitting digital data, and more particularly to methods and devices for transmitting multiple channels of digital data interleaved within a single time division multiplex (hereinafter TDM) time slot.

BACKGROUND OF THE INVENTION

TDM provides a convenient method of transporting multiple channels of digital data via a single physical link. For example, the T1 digital carrier system has been in use since the early 1960's, providing the capability for commercial and public digital communications. The T1 digital carrier system uses two frame formats; the superframe format and the extended superframe format. One difference between the two formats is the distribution of frame synchronization bits. The superframe format embeds a frame synchronization pattern in groups of 12 contiguous frames, while the extended superframe format embeds a frame synchronization pattern in groups of 24 contiguous frames. FIG. 1 shows the structure of the superframe format of the T1 digital carrier system. In general, a T1 superframe link includes 24 distinct TDM time slots, each conveying eight bits of information. A single framing bit is included with each group of 24 TDM time slots to form a frame of 193 bits. The framing bits of 12 consecutive frames form a unique pattern, which is used by the receiving equipment to establish frame synchronization. The transmission rate of a T1 link is 1.544 million bits per second (hereinafter MBPS), so the maximum available data rate for any single time slot is 64 thousand bits per second (hereinafter KBPS). With the T1 TDM architecture, 24 distinct 64 KBPS channels can be transmitted over a single T1 link. To increase bandwidth, a single channel can utilize more than one time slot. For example, if two time slots are used for a single channel, the channel capacity increases to 128 KBPS. If all 24 time slots are used for a single channel, the system achieves the maximum channel capacity of 1.536 MBPS.

For digitized voice transmission, each voice channel is typically conveyed via a single time slot. The original analog voice signal is digitized using pulse code modulation (hereinafter PCM) at a rate of 8000 samples per second. For five of every six frames, eight bit PCM samples are transmitted in a time slot. Seven bit PCM samples are transmitted every sixth frame, with the eighth bit from each time slot being used for signaling. The signaling bits form a control data stream for each time slot, which may be used, for example, to establish a connection or terminate a call.

For digital data transmission, each time slot typically carries up to seven bits of user information, with the eighth bit used for control or unused and set to a constant value. Such an arrangement allows a channel capacity of 56 KBPS per time slot. In some applications, all eight bits of each time slot are used for user information, which allows the maximum channel capacity of 64 KBPS per time slot.

A common scheme known as subrate multiplexing is used to convey multiple low rate channels within a single T1 time slot. Subrate multiplexing uses one of the seven available bits for control, and the remaining six bits for user data, at a total channel capacity of 48 KBPS. The 48 KBPS channel conveys five 9.6 KBPS channels, or ten 4.8 KBPS channels or twenty 2.4 KBPS channels. The control bit contains information which is used by the receiver to determine which of the subrates is being utilized.

A data channel is often accompanied by a low rate status channel which conveys information regarding activity status and/or fault status of the data channel. In the aforementioned subrate multiplexing scheme, no channel capacity is available within a time slot to convey such information. Consequently, one or more additional time slots must be used to transmit the status information.

There is a need for a method and apparatus for increasing the channel capacity of the prior art subrate multiplexing scheme.

It is therefore an object of the invention to provide a method and apparatus for increasing the channel capacity of the prior art subrate multiplexing scheme.

Other objects and advantages of the present invention will become apparent upon consideration of the appended drawings and description thereof.

SUMMARY OF THE INVENTION

The foregoing and other objects are achieved by the invention which in one aspect comprises a system for establishing a TDM information protocol over a communications path. The protocol defines a sequence of frames, and each frame defines n information channels and m additional channels. Within each of the n information channels the protocol defines a succession of k bits. In one embodiment, the system includes a transmit section and a receive section.

The transmit section includes means for allocating the k bits of each of the n information channels to a succession of information elements to form a frame of j bits. The value of j is at least as large as the product of n and k. The transmit section also includes means for transmitting the sequence of frames over the communications path so that the communications path carries a contiguous sequence of frames.

The receive section includes means for receiving the contiguous sequence of frames generated by a transmit section, and means for extracting the succession of information elements from the received sequence of frames.

In one form, the invention receives the succession of information elements from a plurality of sources, and each of the information elements from the plurality of sources includes a data element and a control element, each of which includes a single bit of data and control, respectively.

In another form of the invention, the number of information channels n is 24, the number of bits j in a frame is 193, the number of bits k in each of the information channels is eight, the number of sources providing information elements is five, and the rate of the data elements is 9.6 KBPS and the rate of the control elements is one and one fifteenth KBPS.

In yet another form of the invention, the number of additional channels m is one. The one additional channel includes one bit per frame which transmits a 12 bit framing sequence, whereby the framing sequence repeats every 12 frames.

Another object of the invention is to provide a multiplexor for generating a time division multiplex (TDM) signal having a total of j bits, and includes at least one channel having k bits, which is generated from n digital data signals, m digital control signals, and f TDM frame synchronization bits. Each of the n digital data signals are characterized by a common data rate $R_D$. Each of the m digital control signals is characterized by a data rate $R_{c(i)}$, where i=1, 2, ..., m and $R_{c(i)}$ is less than $R_d$, for all i from 1 to m. In one embodiment, each of the control signal data rates $R_{c(i)}$ are different. In an alternate embodiment, two or more of the control data rates $R_{c(i)}$ may be equal. The total number of bits j in the TDM signal is greater than or equal to the sum of m and n.

The multiplexor includes means for receiving each of the n data signals and each of the m control signal. The multiplexor also includes commutator means for selecting a succession of k-m-f data bits and m control bits. Each of the selected data bits is the oldest data bit not previously selected of the corresponding data signal, and each of the selected control bits is the oldest control bit not previously selected of the corresponding control signal. The data and control bits are selected from a succession of data and control signals, respectively, in a predetermined sequential order.

The multiplexor also includes means for generating a succession of k bits corresponding to the selected succession of k-m-f data bits, m control bits and f channel frame bits. The succession of k bits corresponds to the k bit channel signal which is included in the j bit TDM signal.

In another form of the invention, the predetermined sequential order repeats every q bits.

In yet another form of the invention, the number of bits j in the TDM signal is 193, the number of bits k in the channel signal is 8, the number of digital data signals n is five, the number of control signals m is 1, the number of channel frame synchronization bits f is one, and the number of bits after which the predetermined sequential order repeats is 120.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 4 shows the multiplexing format employed by the invention to distribute information elements within the TDM communications path;

DESCRIPTION OF THE PREFERRED EMBODIMENTS

Figure 1:
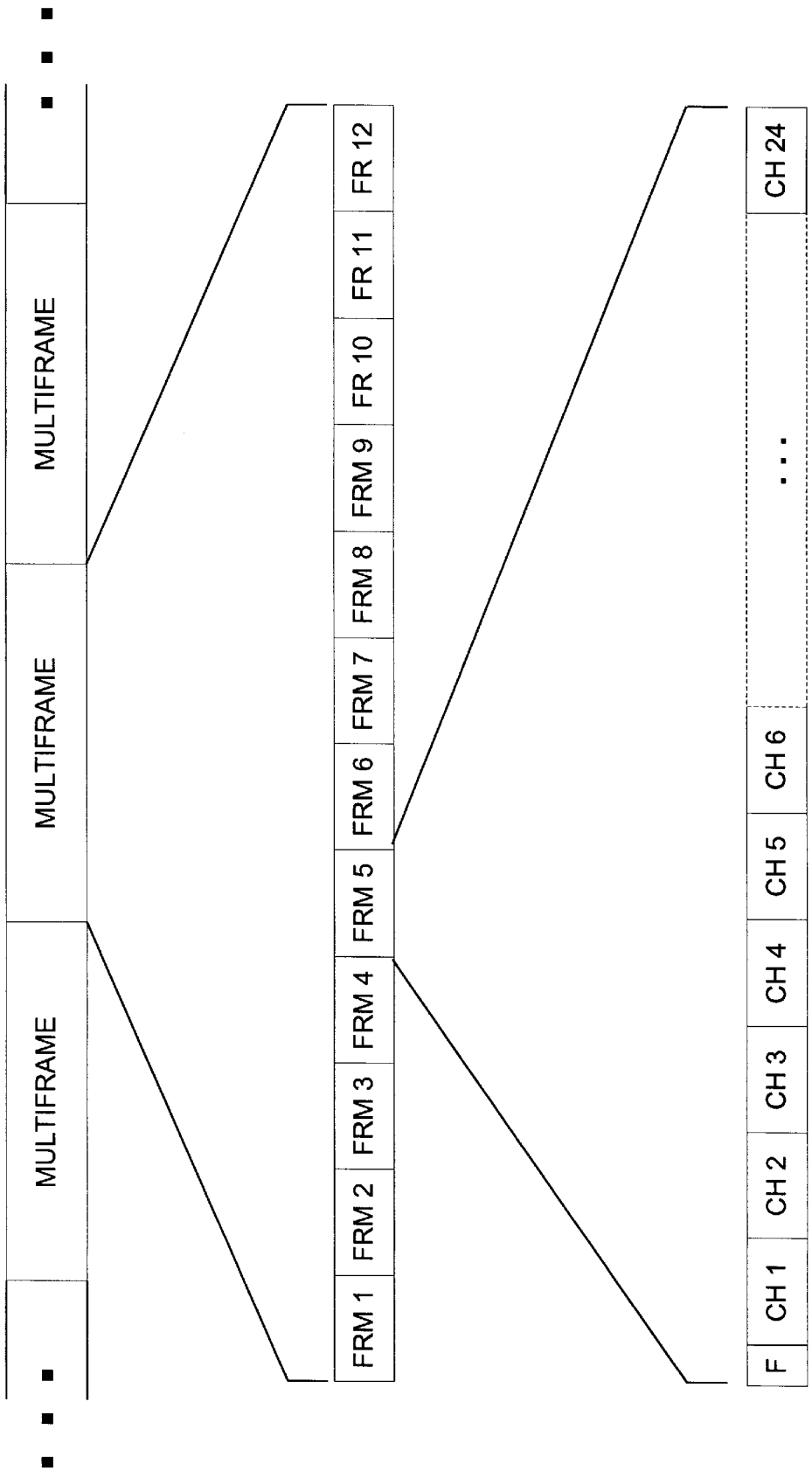
FIG. 1 shows the frame structure of the T1 digital carrier system.
Figure 2:
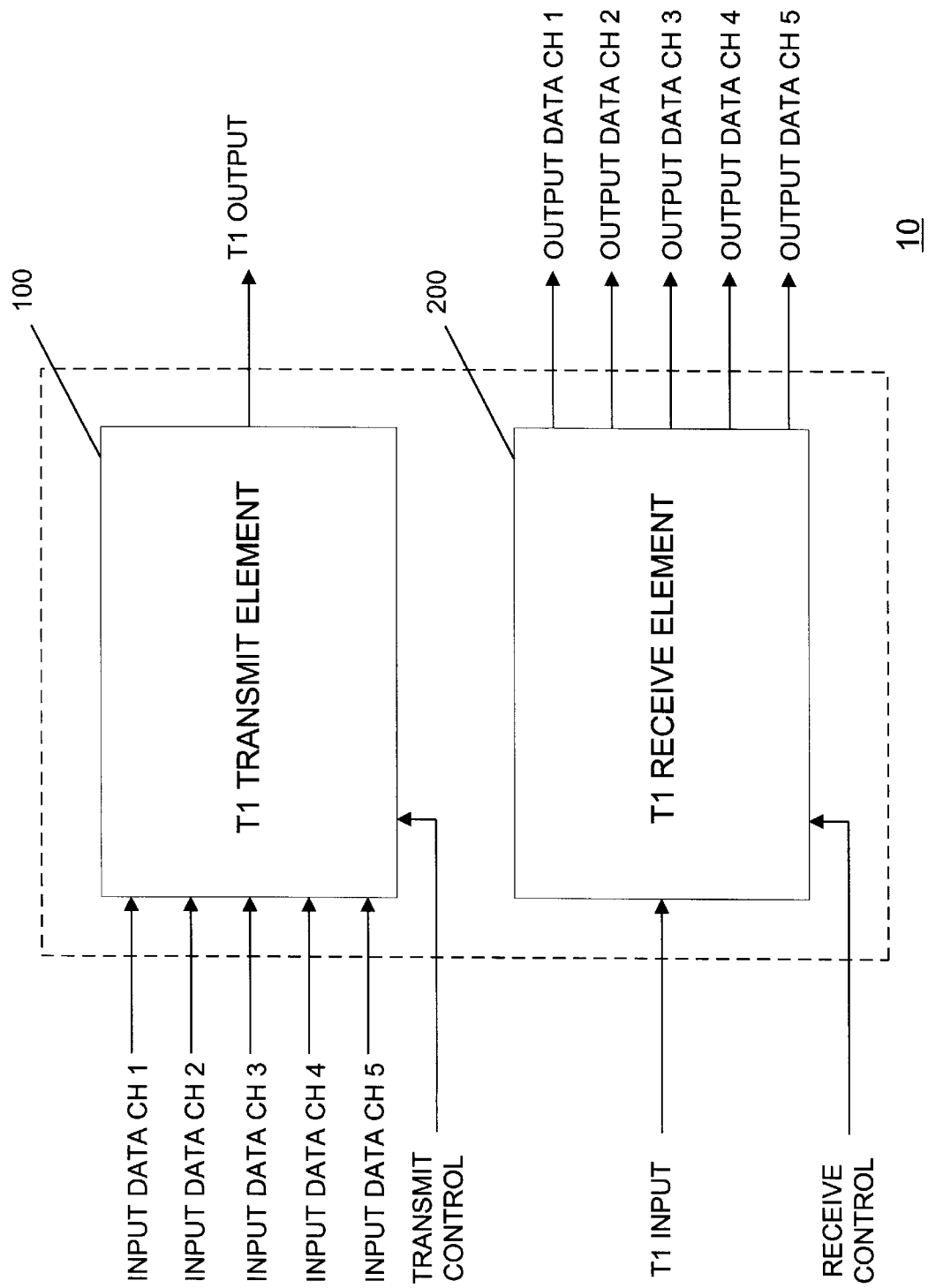
FIG. 2 shows a block diagram of a system for establishing a TDM information protocol over a communications path constructed according to this invention.

FIG. 2 shows a block diagram of the preferred embodiment of a system for establishing a TDM information protocol over a communications path 10, constructed according to the present invention. System 10 includes a T1 transmit element 100 and a transmit receive element 200.

In general, the T1 transmit element 100 receives a succession of data elements from each of a plurality of independent channels and combines the data elements to form a single TDM sequence of data elements.

In general, the T1 receive element 200 receives a TDM sequence of data elements and separates the sequence into its constituent components to form a plurality of channels, each forming a succession of data elements.

Figure 3:
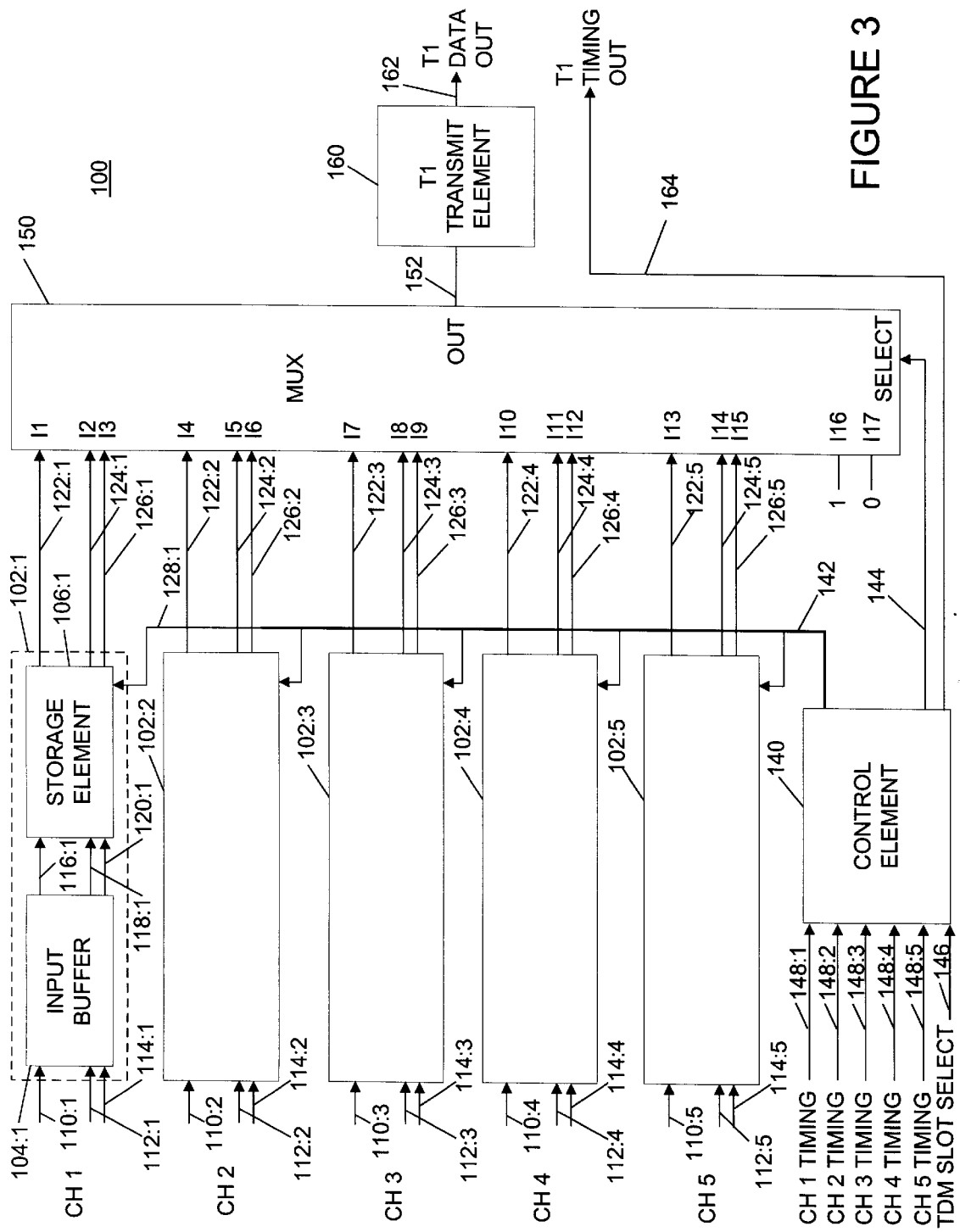
FIG. 3 shows a detailed block diagram of the transmit section of the system of FIG. 2.

FIG. 3 shows a detailed block diagram of a preferred embodiment of the T1 transmit element 100. The T1 transmit section 100 processes a succession of data elements from each of five channel paths. Each data element includes an information element and two control elements. A transmit channel element 102:n receives a succession of information elements at 9.6 KBPS via electrical path 110:n, n being an integer, for all n from one to five. Each transmit channel element 102:n also receives a succession of control elements via electrical paths 112:n and 114:n, for all n from one to five. In the preferred embodiment, the electrical characteristics of the electrical paths 110:n, 112:n and 114:n of each of the transmit channel elements 102:n are defined by RS-422, although those skilled in the art will appreciate that other electrical interfaces may be used.

In FIG. 3, transmit channel element 102:1 further illustrates an input buffer 104 and a transmit storage element 106:1. The structure of transmit channel elements 102:2 through 102:5, although not shown, is identical to that shown for transmit channel element 102:1. The input buffer 104:1 receives an information channel via electrical path 110:1, a first control channel via electrical path 112:1 and a second control channel via electrical path 114:1. The input buffer 104:1 performs the conversion from the electrical characteristics provided by each of the channel sources to the electrical characteristics used internally by the invention.

After converting the electrical characteristics of the digital data elements, the input buffer 104:1 applies the information elements to conductor 116:1, which are received by the transmit storage element 106:1, the input buffer 104:1 applies the first control element to conductor 118:1, which are received by the transmit storage element 106:1, and the input buffer 104:1 applies the second control elements to conductor 120:1, which are received by the transmit storage element 106:1. The transmit storage element 106:1 provides storage for up to m of the most recent data elements, m being an integer, received from the information channel. The transmit storage element 106:1 is an elastic memory, so at any given time, as few as 1 data element or as many m data elements may be stored, and operates as a first-in, first-out (hereinafter referred to as FIFO) memory.

The $n^{th}$ transmit storage element receives a transmit latch signal on transmit latch conductor 128:n, for all n from one to five. The control element 140 applies the five transmit latch signals to the five transmit latch conductors 128:1 through 128:5. The transmit control element 140 receives a timing signal from the $n^{th}$ data channel via timing conductor 148:n, for all n from one to five. The transmit control element uses the timing signal as a reference to identify the temporal boundaries of the succession of data elements for the associated data channel, so that each individual data element may be separated from the adjacent elements.

When the transmit latch signal is asserted, the storage element 106:1 applies the least recent data element to conductors 122:n, 124:n and 126:n, respectively, which are received by a multiplexing element 150. In the preferred embodiment of the invention, the multiplexing element 150 receives a total of fifteen data elements at once from the five receiver elements, including five information elements and ten control elements. The multiplexing element 150 also receives a constant logic one and a constant logic zero, making the total number of inputs to the multiplexing element 150 seventeen. The multiplexing element 150 selects one of the seventeen inputs, determined by a transmit select signal the multiplexing element 150 receives on transmit select conductor 144, and applies the selected element to an output conductor 152. A T1 transmit element 160 receives the selected element applied to output conductor 152, and applies the selected element to T1 output conductor 162, using the electrical characteristics defined by the host T1 carrier system.

In general, the invention receives data elements from each of the five input channels and distributes the received data elements in a serial TDM output stream. In the preferred embodiment, the invention distributes the input data elements within one of the 24 TDM slots defining the T1 digital carrier system, so that the remaining 23 TDM slots are available to other users, or for other unrelated purposes by the same user. The particular time slot used to carry the input data elements is selected by the user of the invention via a signal applied to the time slot select bus 146 and received by the control element 140. Data elements are distributed within the selected time slot using the sequence defined in FIG. 4. The column in FIG. 4 labeled "Subframe #" refers to an opportunity for the selected time slot. In the T1 carrier system, an opportunity for a given time slot occurs every 193 element intervals at 1.544 million elements per second, or every 125 $\mu$S. Subframe #2 occurs 125 $\mu$S after subframe #1, subframe #3 occurs 125 $\mu$S after subframe #2, etc. As FIG. 4 shows, the format of data elements within a time slot repeats every five time slots. The first bit of every time slot is a sub-framing bit. The sub-framing pattern is a 15 element sequence defined as 001 10 11111 11111, so a sub-frame is formed by 15 selected time slot opportunities. In FIG. 4, an information element from channel n is defined by the marker Dn, and a control element in general is defined by the marker $M_{n,p}$, for all n from one to five and all p from one to two. Using the interleave pattern shown in FIG. 4, the invention transmits 18 information elements from each channel during the course of 15 consecutive frames. Since one control element marker $M_{n,p}$ is sent in each time slot, the invention can send up to 15 control elements during each sub-frame. However, the preferred embodiment of the invention sends only 10 control elements per sub-frame and sets the remaining five available markers to a logic one. The control element pattern within a subframe is

11111 $M_{1,1}M_{1,2}M_{2,1}M_{2,2}M_{3,1}M_{3,2}M_{4,1}M_{4,2}M_{5,1}M_{5,2}$, where $M_{n,1}$ represents a first control element from the $n^{th}$ channel, and $M_{n,2}$ represents a second control element from the $n^{th}$ channel. Alternate embodiments of the invention could use other control element patterns within a subframe, for example:

11111 $M_{1,1}M_{2,1}M_{3,1}M_{4,1}M_{5,1}M_{1,2}M_{2,2}M_{3,2}M_{4,2}M_{5,2}$.

Figure 5:
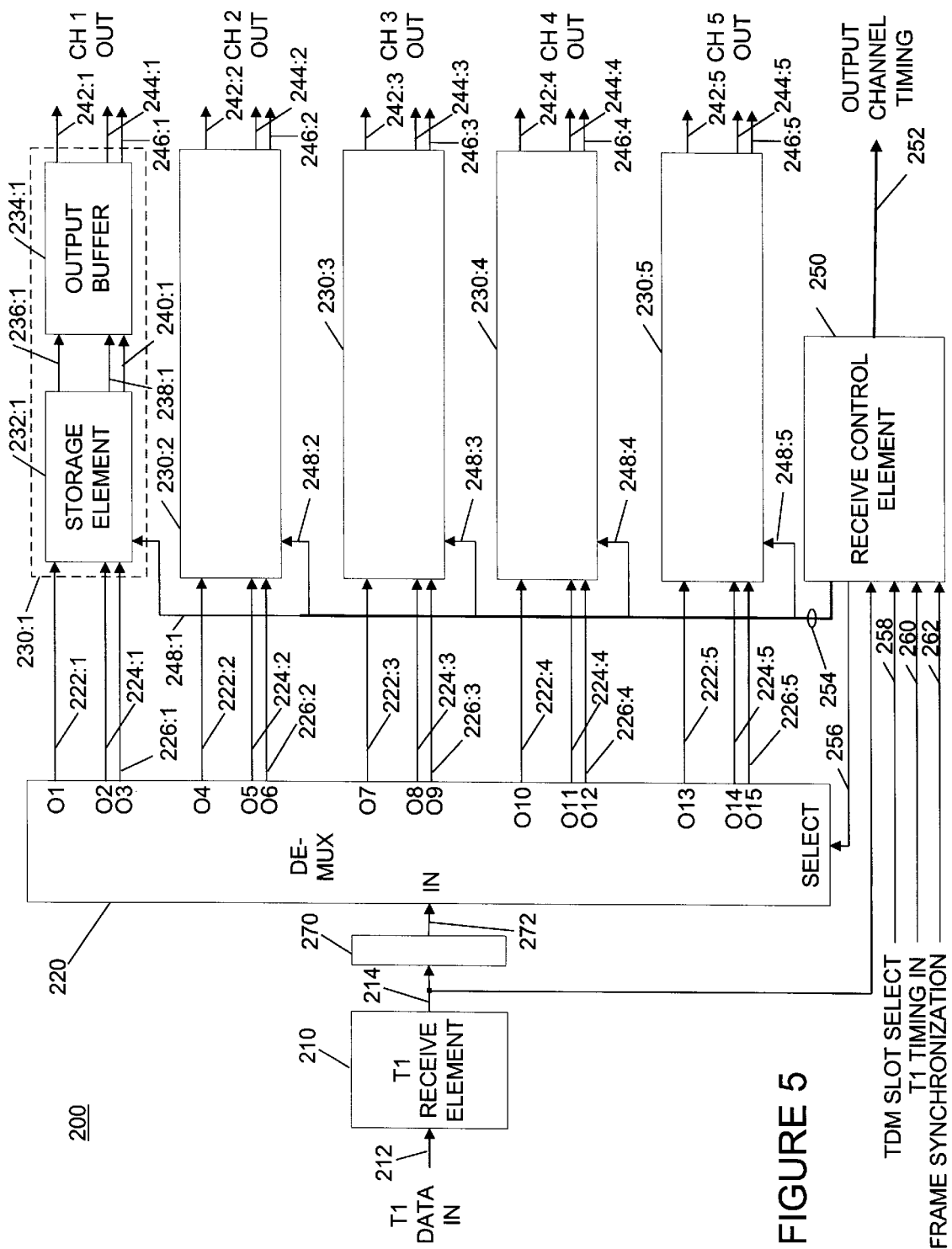
FIG. 5 shows a detailed block diagram of the receive section of the system of FIG. 2.

FIG. 5 a block diagram of a preferred embodiment of the T1 receive section 200 of the invention. A T1 receive element 210 receives a succession of digital data elements applied to T1 input conductor 212 by the T1 digital carrier system. The T1 receive element 210 performs the electrical conversion from the electrical characteristics of the T1 system to the electrical characteristics used internally by the invention.

After performing the electrical conversion, the T1 receive element applies the succession of data elements simultaneously to a delay element 270 and a receive control element 250 via electrical conductor 214. The delay element 270 delays the succession of data elements by k data element intervals, and then applies the delayed data elements to de-multiplexer 220 via electrical conductor 272. The receive control element 250 applies a receive select signal to receive select bus 256. The de-multiplexing element 220 routes the data elements it receives from electrical conductor 214 to one of fifteen outputs, as directed by the receive select signal on receive select bus 256.

The outputs of the de-multiplexing element 220 are grouped in sets of three. The $n^{th}$ receive channel element 230:n receives the set of three conductors 222:n, 224:n and 226:n, for all n from one to five. In FIG. 5, receive channel element 230:1 further illustrates a receive storage element 232:1 and an output buffer 234:1. The structure of receiver channel elements 230:2 through 230:5, although not shown, is identical to that shown for receiver channel element 230:1. The receive storage element 232:1 receives data elements from the de-multiplexing element 220 via the three conductors 222:1, 224:1 and 226:1. The receive storage element accepts control signals via receive control bus 248:1 from receive control element 250. The receive storage element provides storage for up to j of the most recent data elements, j being an integer, received from the de-multiplexing element 220. The receive storage element 232:1 is an elastic memory, so at any given time, as few as 1 data element or as many j data elements may be stored, and operates as a FIFO memory. Only one of the tree data elements applied to the receive channel element is stored at a time. When a control signal is asserted on control bus 248:1, the receive storage element 232:1 stores one of the three data elements applied to conductors 222:1, 224:1 or 226:1; which of the three data elements is stored depends upon the nature of the control signal.

The receive storage element 232:1 applies stored data elements selected by the control signals on bus 248:1 to electrical conductors 236:1, 238:1 and 240:1, which are received by output buffer 234:1. Data elements are applied to conductors 236:1, 238:1 and 240:1 individually, so the state of only one, any two or all three conductors may change at a given time. Output buffer 234:1 performs the conversion from the electrical characteristics used internally by the invention to the electrical characteristics required by the output channels. After performing the electrical conversion of the data elements received on conductors 236:n, 238:n and 240:n, the output buffer from the $n^{th}$ receive channel element applies the data elements to conductors 242:n, 244:n and 246:n, respectively.

The receive control element receives a TDM slot select signal on slot select bus 258, a T1 timing signal on T1 timing conductor 260 and a frame synchronization signal on frame synchronization conductor 262. The TDM slot select signal identifies which one of the twenty four T1 TDM time slots (hereinafter referred to as the selected time slot) contains the transmitted data elements. The T1 timing signal marks the temporal boundaries of the succession of T1 input data elements. The frame synchronization signal marks the temporal boundaries of the contiguous T1 frames, each of which includes 193 data elements.

In general, the T1 receive section 200 performs the inverse function of the T1 transmit section. The T1 receive section 200 receives a succession of data elements from a serial TDM input stream and distributes each of the received data elements to the corresponding output channel. In one form, the invention extracts a succession of T1 data elements, according to the distribution sequence defined in FIG. 4, from one of the twenty four TDM slots defining the T1 digital carrier system. After converting the electrical characteristics of each of the succession of T1 data elements to the electrical characteristics used internally by the invention, the T1 receive element distributes the data elements simultaneously to the delay element 270 and the receive control element 250. Using the T1 timing signal and the TDM slot select signal as a reference, the receive control element 250 identifies and stores the most recent 15 selected time slots from the most recent 15 frames. The receive control element 250 extracts the sub-framing bits from the most recent 15 selected time slots and searches for the sub-framing synchronization pattern of 00110 11111 11111.

The receive control element 250 repeats the sub-frame synchronization analysis each time the receive control element 250 receives a new selected time slot, until a sub-frame synchronization pattern is recognized. Once a sub-frame synchronization pattern is recognized, the receive control element 250 routes each of the succession of input data elements through de-multiplexer 220 to the corresponding channel, according to the sequence presented in FIG. 4.

For each of the receive channel elements 230:n, the de-multiplexer element applies an information element, represented by Dn in FIG. 4, to conductor 222:n, a first control element, represented by $M_{n,1}$ in FIG. 4, to conductor 224:n, and a second control element, represented by $M_{n,2}$ in FIG. 4, to conductor 226:n. The order in which each of the elements are applied to the corresponding conductor is defined in FIG. 4. The sub-framing bits are not used once sub-frame synchronization has been established and are effectively discarded by not storing them in any storage element when available from the succession of data elements at the input of the de-multiplexing element 220.

The storage elements 232:n apply stored data elements to the output buffers 234:n via conductors 236;n, 238:n and 240:n, for all n from one to five. A data element is applied to a particular conductor as a response to a control signal from receive control element 250 on control bus 248:n. In general, data elements are removed from the storage element and applied to the output buffer 234:n at a rate required by the output channel. In one form of the invention, data elements are applied to the output channels at a rate of 9.6 KBPS. The receive control element applies output channel timing signals to output channel timing bus 252, which includes at least one timing signal for each of the five output channels. The $n^{th}$ timing signal identifies the temporal boundaries of the data elements applied to the output conductors 242:n, 244:n and 246:n.

The present embodiments are therefore to be considered in all respects as illustrative and not restrictive, the scope of the invention being indicated by the appended claims rather than by the foregoing description, and all changes which come within the meaning and band of equivalency of the claims are therefore intended to be embraced therein.

What is claimed is:

1. A multiplexer for generating a time division multiplex (TDM) signal, including at least one channel signal having k bits generated from (i) n digital data signals, each characterized by a data rate $R_D$, (ii) m digital control signals, each characterized by a data rate $R_{c(i)}$, where i=1, 2, ..., m, where $R_{c(i)}$ is less than $R_D$, and (iii) f channel frame synchronization bits, comprising:

A. a receiver for receiving each of said n data signals and m control signals;

B. a commutator for selecting a succession of k-m-f data bits, m control bits and f channel frame synchronization bits, each of said selected data bits being the oldest not previously selected bit of one of said n data signals, where k-m-f selected data bits are selected from a succession of said n data signals in a predetermined sequential order, and each of said selected control bits being the oldest not previously selected bit of one of said m control signals, where m said selected control bits are selected from a succession of said m control signals in a predetermined sequential order, and said f channel frame synchronization bits being selected from a q bit channel frame synchronization pattern; and C. means for generating a succession of k bits corresponding to said selected succession of k-m-f data bits, said selected succession of m control bits and said f channel frame bits, said succession of k bits corresponding to said k-bit channel signal included in said TDM signal.

2. A multiplexer according to claim 1 wherein said predetermined sequential order repeats after q instances of said succession of k bits.

3. A multiplexer according to claim 2 wherein k=8, n=5, m=1, f=1, and q=15.

4. System for establishing a time division multiplex (hereinafter TDM) information protocol over a communications path, said protocol defining a sequence of frames, each frame defining n information channels and m additional channels, and said protocol defining within each of said n information channels, a succession of k bits, comprising:

A. means for allocating said k bits of each of said n information channels to each of a succession of information elements to form, along with said m additional channels, a frame of j bits, j being at least the product of n and k;

B. means for transmitting said sequence of frames over said communications path, whereby said communications path carries a contiguous sequence of frames;

C. means for receiving said contiguous sequence of frames from said communications path;

D. means for extracting each of said succession of information elements from said sequence of frames.

5. A system according to claim 4, wherein said succession of information elements defines a TDM sequence including information elements from a set of p distinct sources, said information elements include data elements and control elements and each of said information elements includes one bit of information.

6. A system according to claim 5, wherein n is 24, k is eight, j is 193 and p is five, said five distinct sources each convey said data elements at a rate of 9.6 KBPS and each convey said control information at a rate of one and one-fifteenth KBPS.

7. A system according to claim 4, wherein m is one, said additional channel includes one bit per frame over a consecutive sequence of 12 frames, so as to form a framing sequence having 12 bits.

* * * * *